US007044592B2

(12) United States Patent
Sato et al.

(10) Patent No.: US 7,044,592 B2
(45) Date of Patent: May 16, 2006

(54) PROCESS FOR FORMING IMAGE WITH LIQUID DROPLETS, IMAGE FORMING APPARATUS UTILIZING SUCH PROCESS AND PROCESS FOR EJECTING AND PROJECTING LIQUID DROPLETS

(75) Inventors: Koichi Sato, Kanagawa (JP); Hidemasa Mizutani, Kanagawa (JP); Kazuharu Katagiri, Tokyo (JP); Yukio Hanyu, Kanagawa (JP); Hirokatsu Miyata, Kanagawa (JP); Ikuo Nakazawa, Kanagawa (JP); Miki Ogawa, Kanagawa (JP); Tomonari Horikiri, Kanagawa (JP); Masayuki Ikegami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 10/105,442

(22) Filed: Mar. 26, 2002

(65) Prior Publication Data

US 2002/0180854 A1 Dec. 5, 2002

(30) Foreign Application Priority Data

Mar. 28, 2001 (JP) ...................................... 2001-094109

(51) Int. Cl.
*G01D 11/00* (2006.01)

(52) U.S. Cl. ..................... 347/100; 347/101; 106/31.13

(58) Field of Classification Search ................. 347/100, 347/95, 96, 102, 103; 106/31.13, 31.27, 31.6; 523/160; 397/75

See application file for complete search history.

(56) References Cited

U.S. PATENT DOCUMENTS

| | | | | |
|---|---|---|---|---|
| 3,962,969 A | | 6/1976 | Watanabe et al. | |
| 4,399,443 A | * | 8/1983 | Yasufuku et al. | 347/100 |
| 4,838,940 A | * | 6/1989 | Kan et al. | 106/31.13 |

(Continued)

FOREIGN PATENT DOCUMENTS

| | | | |
|---|---|---|---|
| EP | 0 248 667 | | 12/1987 |
| EP | 0 845 357 | | 6/1998 |
| EP | 0 953 614 | | 11/1999 |
| EP | 1 041 126 | | 10/2000 |
| EP | 1072956 | A2 * | 1/2001 |
| EP | 1184427 | A2 * | 3/2002 |
| EP | 1 243 624 | | 9/2002 |
| JP | 58-215671 | | 12/1983 |
| JP | 8-253717 | | 10/1996 |
| JP | 11-80221 | | 3/1999 |
| JP | 11-322866 | | 11/1999 |
| JP | 11-322942 | | 11/1999 |
| JP | 2000-66522 | | 3/2000 |

OTHER PUBLICATIONS

Fukumoto, et al., "Printing with Ink Mist Ejected by Ultrasonic Waves," Journal of Imaging Science and Technology, vol. 44, No. 5, Sep./Oct. 2000, pp. 398–405.

*Primary Examiner*—Manish Shah
*Assistant Examiner*—Leonard Liang
(74) *Attorney, Agent, or Firm*—Fitzpatrick, Cella, Harper & Scinto

(57) ABSTRACT

An image forming process provides an excellent ink fixation effect for high speed, low energy consumption printing. Two-valued or multi-valued gradation expression of a picture element, or the smallest output unit, is realized by controlling the number of liquid droplets impacting on a recording medium for each dot formed on the recording medium. The liquid droplets are subjected to physical or chemical modification so as to be fixed to the recording medium. The present invention is also directed to an image forming apparatus, an ink for liquid droplet recording and a liquid droplet ejection and projection method that can use the image forming process.

16 Claims, 4 Drawing Sheets

U.S. PATENT DOCUMENTS 4,962,389 A * 10/1990 Kan et al. ................ 346/140.1
5,021,802 A 6/1991 Allred
5,129,948 A * 7/1992 Breton et al. ............ 106/31.43
5,139,574 A * 8/1992 Winnik et al. ................ 524/84
5,145,518 A * 9/1992 Winnik et al. .............. 523/161
5,272,201 A * 12/1993 Ma et al. .................... 524/505
5,515,093 A * 5/1996 Haruta et al. ............... 347/101
5,531,817 A * 7/1996 Shields et al. ........... 106/31.38
5,618,337 A * 4/1997 Shinozaki et al. ....... 106/31.29
5,641,346 A * 6/1997 Mantell et al. .......... 106/31.58
5,752,142 A * 5/1998 Staples et al. .............. 399/241
5,766,326 A * 6/1998 Gundlach et al. ........ 106/31.47
5,854,307 A * 12/1998 Kimura et al. .............. 523/161
5,912,280 A * 6/1999 Anton et al. ................ 523/161
5,955,515 A * 9/1999 Kimura et al. .............. 523/161
5,958,169 A 9/1999 Titterington et al.
6,044,762 A * 4/2000 DeBoer et al. ............. 101/466
6,084,619 A * 7/2000 Takemoto et al. ............ 347/96
6,306,994 B1 * 10/2001 Donald et al. ........... 526/317.1
6,412,937 B1 * 7/2002 Kato et al. .................. 347/100

* cited by examiner

PROCESS FOR FORMING IMAGE WITH LIQUID DROPLETS, IMAGE FORMING APPARATUS UTILIZING SUCH PROCESS AND PROCESS FOR EJECTING AND PROJECTING LIQUID DROPLETS

BACKGROUND OF THE INVENTION

1. Field of the Invention

This invention relates to an image forming process for forming a high quality image at high speed on an energy saving basis. The process according to the invention can suitably be utilized for printers and displays. The present invention also relates to an image forming apparatus that utilizes such an image forming process.

2. Related Background Art

Known image forming processes include those based on ink-jet printing and electrophotography. In recent years, their significance has been increasing in offices and homes from the viewpoint of image recording technology. Under these circumstances, there is a strong demand for image forming processes that can produce high quality images at high speed on an energy saving basis particularly in the field of printing because the users are highly ecology-oriented in recent years. Higher quality images refer to those of higher resolution and those of greater number of gradation expressions, while a high speed colorant fixing process may be required to achieve the objectives of high speed and energy saving.

In the field of dry electrophotography, high speed engines of the 60 ppm class are being realized for color printing by introducing a tandem structure. On the other hand, the fixing process utilizing a toner fusion mode is required to be more energy saving. While the image quality has been and still is being improved in the field of ink-jet technology as a result of miniaturization of nozzles, various problems are to be solved mainly because of the use of thin aqueous ink solution. Particularly, realization of a high speed fixing process is a major challenge in this technological field. Currently, energy saving high speed fixing, processes using reactive coloarants are being discussed as a technological breakthrough. The use of reactive ink is being actively studied in consideration of the problem of bleeding and feathering. For example, Japanese Patent Application Laid-Open No. 8-253717 discloses the use of such ink.

However, the requirements of high speed and energy saving are becoming more and more rigorous from the viewpoint of convenience and ecology, although such requirements may be met only on the basis of tradeoff with the requirement of high quality images. Additionally, the image forming technology is being required to be able to form an image on various recording mediums including ordinary plain paper to say nothing of specifically treated paper that is dedicated to ink-jet printing. All in all, there is a strong demand for improved image forming processes and improved inking techniques.

SUMMARY OF THE INVENTION

In view of the above identified circumstances, it is therefore the object of the present invention to provide an image forming process and an image forming apparatus that can be applicable to a wide variety of recording mediums to produce high quality images at a high fixing speed and a low energy consumption rate.

In an aspect of the present invention, there is provided an image forming process for forming an image by means of dots of liquid droplets with an equivalent circle diameter of 10 μm or less, characterized in that said liquid droplets are fixed to a recording medium by physical modification or chemical modification.

In another aspect of the present invention, there is provided a process for ejecting and projecting liquid droplets from an ejection head to a recording medium and fixing them to the medium, characterized in that said liquid droplets have an equivalent circle diameter of 10 μm or less and are adapted to be physically modified.

In still another aspect of the present invention, there is provided a process for ejecting and projecting liquid droplets from an ejection head to a recording medium and fixing them to the medium, characterized in that said liquid droplets have an equivalent circle diameter of 10 μm or less and are adapted to be chemically modified.

In still another aspect of the present invention, there is provided an ink for liquid droplet recording adapted to produce droplets with an equivalent circle diameter of 10 μm or less and characterized in that said liquid droplets are fixed to the recording medium by physical modification or chemical modification.

In still another aspect of the present invention, there is provided an ink for liquid droplet recording adapted to produce droplets, characterized in that said ink is a sol ink and said sol ink shows sol-gel transition by way of physical modification or chemical modification.

In a further aspect of the present invention, there is provided an image forming apparatus comprising a liquid droplet ejection means for ejecting liquid droplets with an equivalent circle diameter of 10 μm or less, a recording medium and a recording medium conveying means, characterized in that said liquid droplets are fixed to the recording medium by physical modification or chemical modification.

DESCRIPTION OF THE PREFERRED EMBODIMENTS

Now, the present invention will be described in greater detail by referring to the accompanying drawings that illustrate preferred embodiments of the invention.

According to the invention, there are provided an image forming process and an image forming apparatus that are adapted to use droplets having an equivalent circle diameter of 10 μm or less (to be also referred to as mist hereinafter) and fix them to a recording medium by physical modification or chemical modification. The present invention also provides a recording ink to be used with a process and an apparatus according to the invention. There is also provided a process for ejecting and projecting liquid droplets. The present invention is characterized in that ink is fixed to a recording medium by physical modification or chemical modification. Preferably, sol-gel transition is utilized. An image forming process according to the invention is adapted to both direct recording and indirect recording. Conventional apparatus adapted to direct recording and/or indirect recording can suitably be used with a process according to the invention.

For the purpose of the present invention, the expression of "equivalent circle diameter" refers to the diameter of a circle that is equivalent to an ink dot in terms of area. It is also referred to as Heywood diameter. It is determined by the formula shown below.

equivalent circle diameter $$=2\sqrt{(\text{area of a dot}/p)}$$

The equivalent circle diameter can be determined by means of an image analysis system as described below. input system: optical microscope (×100) and CCD camera (KY-F30: tradename, available from Victor Company of Japan) image processing system: personal computer for control (PC-980ORL: tradename, available from Nippon Electric) image processor: (LA-555, 512×512 pixels: tradename, available from PIAS) display system: TV monitor (V-1000: tradename, available from Victor Company of Japan)

Firstly, the image processor is made to store a dot image, a binarized dot profile is extracted and the number of pixels of the extracted profile that are read by the CCD is counted. Then, the total number of the counted pixels is reduced to an actual area. Thereafter, the diameter of an equivalent circle is obtained from the area. Finally, the average number of dots is determined by using the obtained numerical values.

Figure 1A:
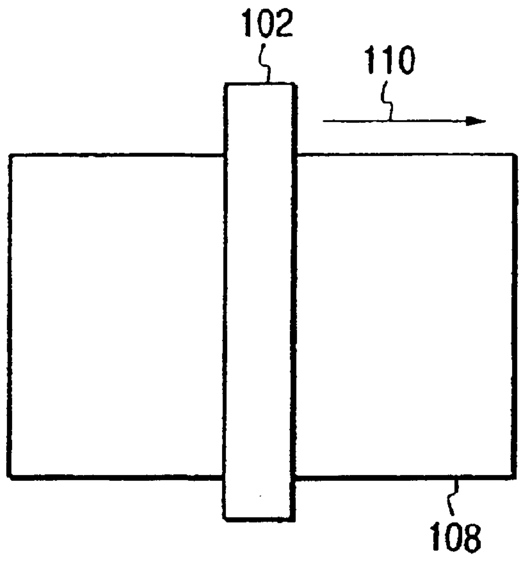
FIGS. 1A and 1B are schematic illustrations of an embodiment of an image forming process and that of an image forming apparatus according to the invention and adapted to direct recording.
Figure 1B:
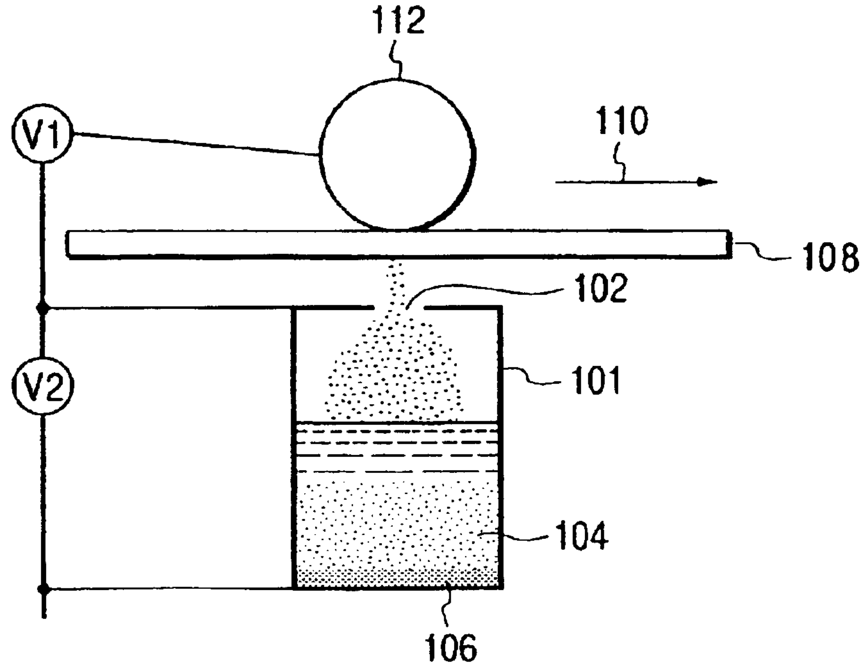

Now, an embodiment of the present invention will be described. It is a direct recording process. An on-demand type ink mist ejection and projection device as shown in FIGS. 1A and 1B can advantageously be used for a direct recording process. FIGS. 1A and 1B illustrate an image forming process using a single liquid ink. FIG. 1A is a schematic view as viewed from the side of the head (or the ink tank) of the apparatus and FIG. 1B is a schematic lateral view. For the purpose of convenience, the ink tank and some other components are omitted from FIG. 1A. With the image forming process illustrated in FIGS. 1A and 1B, ink is projected from a mist ejection/projection head 102 that is a multi-nozzle head onto a recording medium 108 in order to record an image on the recording medium. As shown in FIGS. 1A and 1B, a counter electrode 112 is provided to control ink mist in such a way that mist is electrically charged before it is projected onto the recording medium 108. The head 102 is continuously moved in the direction of arrow 110 to draw a desired image. The mist that is applied to the recording medium causes a reaction that makes it become modified and fixed to the recording medium 108.

The apparatus of FIGS. 1A and 1B is a single liquid type recording apparatus comprising an ultrasonic wave generator 106 that operates for generating mist, an ink tank 101 filled with the ink of the invention and adapted to give rise to a physical or chemical change (to be also referred to as the ink of the invention hereinafter) and a counter electrode 112 arranged at a position opposite to the mist head 102 of the ink tank 101.

According to the invention, the ink of the invention is turned into mist and projected onto the recording medium, where it adheres and is fixed. When the ink is fixed onto the recording medium, it is modified from sol to gel. Any physical or chemical process may be used for the modification process. For example, an ink material that shows thermal sol-gel transition may be used in a physical process for the purpose of the present invention. More specifically, ink is held at high temperatures in the ink mist head to reduce it to sol before it is ejected and projected onto the recording medium. Once the ink arrives at and adheres to the recording medium, it gels and becomes fixed onto the recording medium.

On the other hand, alkali sol ink that turns into gel in an acidic condition and an acidic gellant may be brought into contact with each other in a chemical process for the purpose of the invention. Alternatively, ink having a photo-cross-linking type functional group may be used to record an image on a recording medium by means of the ink mist head and then turn into cross-linked gel as it is irradiated with ultraviolet rays in a chemical process. Still alternatively, ink may be brought into contact with a liquid agent containing polyvalent cations so as to turn into gel in a chemical process.

If a chemical change is used for the purpose of the present invention, a chemical process of modifying inflammable or hardly flammable silicon oil or fluorine oil ink may be utilized. When such a process is used, it is preferable to use silicon oil ink or fluorine ink oil that contains a silicon compound or a fluorine compound, whichever appropriate, having a reactive group. With such a chemical change, ink is fixed without requiring quick application of a large amount of thermal energy. Therefore, this is an energy saving process.

Figure 2A:
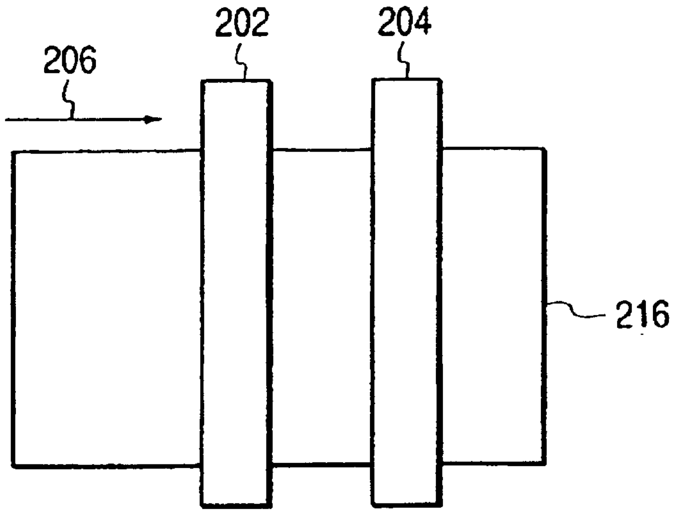
FIGS. 2A and 2B are schematic illustrations of another embodiment of an image forming process and that of an image forming apparatus according to the invention and adapted to direct recording.
Figure 2B:
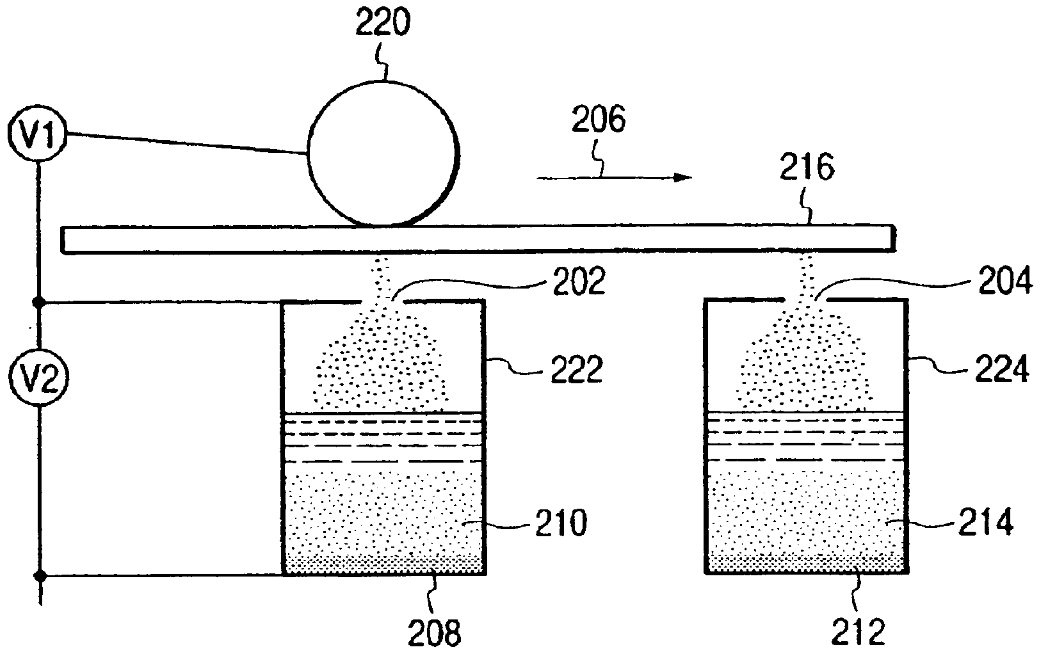

Specific examples of processes involving modification include those using two different types of inks. FIGS. 2A and 2B schematically illustrate a process of forming an image by using two types of inks of the invention. FIG. 2A is a schematic view as viewed from the side of the head (or the ink tank) of the apparatus and FIG. 2B is a schematic lateral view. For the purpose of convenience, the ink tanks 222, 224 and some other components are omitted from FIG. 2A. The two-liquid type recording apparatus of FIGS. 2A and 2B comprises ultrasonic wave generators 208, 212 for generating mist, an ink tank 222 containing the ink of the invention and adapted to change physically or chemically, another ink tank 224 containing a reactive agent 214 that reacts with the ink of the invention and a counter electrode 220 disposed at a position opposite to the ink tanks 222, 224 and the mist jet heads 202, 204 of the apparatus.

As shown in FIGS. 2A and 2B, the ink is turned into mist and driven to be projected by means of two heads 202, 204. Firstly, the reactive agent ink 214 is projected from the first head 204 and then an ink containing a colorant, which may be silicon oil or fluorine oil containing the colorant, is projected and applied onto a recording medium 216 from the second head 202. As shown in FIGS. 2A and 2B, a counter electrode 220 is provided to control the ink mist in such a way that the mist is electrically charged before it is projected onto the recording medium 216. The heads 202 and 204 are continuously moved in the direction of arrow 206 to draw a desired image. The mist that is applied to the recording medium causes a reaction that makes itself to be modified and fixed to the recording medium 216.

It is also possible to employ a process in which two types of inks are also used but the reactive ink is applied not only to the image recording areas on the recording medium but to the entire surface of the recording medium, and then the ink of the invention, which may be silicon oil or fluorine oil containing the colorant, is projected and applied onto the image forming areas of the recording medium 216 from the second head 202 so that the two types of inks react with each other and become fixed on the recording medium.

Both of the two types of inks to be used with the above process may contain a coloring material or only one of them may contain a coloring material.

Of course, it may be so arranged that a single type of ink reacts with the recording medium and becomes modified. The coloring material may be a dye or a pigment.

Figure 3:
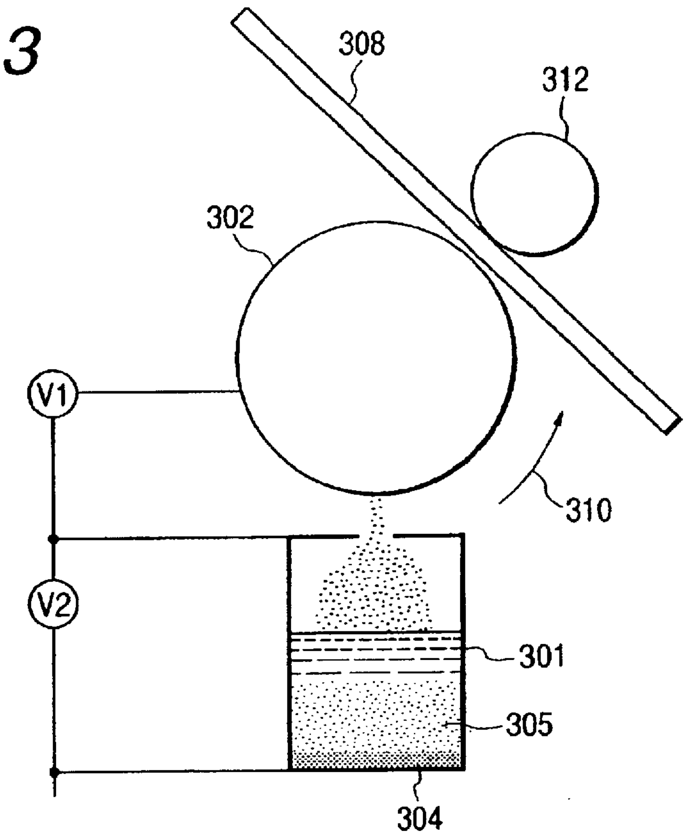
FIG. 3 is a schematic illustration of still another embodiment of an image forming process and that of an image forming apparatus according to the invention and adapted to direct recording, showing that an image is being formed by means of an intermediary transfer medium.

It is preferable to use an intermediary transfer medium. FIG. 3 is a schematic illustration of still another embodiment of the image forming process and that of the image forming apparatus according to the invention and adapted to indirect recording, showing that an image is being formed by means of an intermediary transfer medium. The embodiment of the image forming apparatus shown in FIG. 3 is a two-liquid type recording apparatus that comprises an ultrasonic wave generator 304 that operates for generating mist, an ink tank 301 containing ink 305 of the invention that is adapted to change physically or chemically when applied onto a recording medium, another ink tank (not shown because it is hidden behind the ink tank 301) containing a reactive agent that reacts with the ink of the invention and an intermediary transfer medium 302 disposed opposite to the mist heads of the ink tanks. The apparatus of FIG. 3 is adapted to use two different types of inks and projects firstly the reactive agent ink onto the intermediary transfer medium 302 by means of the first ink head and then the ink containing a coloring agent onto the intermediary transfer medium 302 by means of the second ink head. Thereafter, the image formed on the intermediary transfer medium 302 is transferred onto a recording medium 308 by means of a transfer mechanism 312 and the ink is caused to react with the reactive agent and become modified on the recording medium 308. With this process according to the invention and using two types of inks, it is also possible to spray the reactive agent not only to the image recording areas on the recording medium but to the entire surface of the recording medium. Then, the ink containing a coloring agent is projected onto the image recording areas by means of the ink head and transferred onto the recording medium. Thereafter, the applied ink reacts with the reactive agent and becomes modified.

The image forming processes and the image forming apparatus described above are of so-called direct recording types that utilize one or two ink mist heads and can use any of a variety of recording heads having different configurations. For example, it may use a head using a piezoelectric element as described in Japan Hard Copy '99 Treatises, p. 343, a field control type aperture head such as the one described in Japanese Patent Application Laid-Open No. 58-215671 or Japanese Patent Application Laid-Open No. 2000-66522, or a toner jet type head T-Fax (tradename, available from Telecom Germany). Since these heads are driven by controlling the intensity and the duration of application of an electric field, it is possible to control the amount of mist that is projected from a single nozzle to form a picture element, which is the smallest output unit. Therefore, it is possible to provide analog gradation expression in order to realize high definition and high gradation expression. Thus, a high quality image can be produced by means of an image forming process and an image forming apparatus according to the invention.

As pointed out above, a picture element is the smallest unit for forming an image. An image forming process adapted to produce a high quality image by gradation expression using a number of liquid droplets in a controlled manner is advantageously used in order to draw each picture element.

While an ink-jet system is basically designed to project a single liquid droplet from a nozzle at a time, an ink mist system is adapted to use mist containing liquid droplets much smaller than their counterparts of the ink-jet system. Thus, if the ink mist system is compared with the ink-jet system, a given volume of ink has a surface area dramatically greater in the ink mist system than in the ink-jet system. The inventors of the present invention found that the ink mist system provides a remarkable effect on the ink modification process using reactive ink. More specifically, the surface area of a given amount of ink is dramatically increased more than ever by using ink mist containing small liquid droplets for forming an image. In the case of the two-liquid ink system, a large surface area means a large surface area along which liquid droplets of two types of inks can come into contact with each other. Then, as a result, the rate with which the applied ink is modified or the applied ink reacts with the reactive agent is dramatically raised to realize the effect and the advantage of high speed ink fixation effect. In the case of the one-liquid ink system, a similar effect and a similar advantage can be achieved because of a dramatic increase in the number of reaction points.

In order for the effect and the advantage to be very remarkable, an optimal droplet size needs to be selected for ink mist. While a smaller droplet size may be preferable from the viewpoint of increasing the surface area, there must be an optimal size that maximally encourages the applied ink and the recording medium to react with each other and positively participate in the fixing process. In reality, the use of popular plain paper as the recording medium is advantageous from the industrial point of view. The average size of the pores of plain paper, which is a three-dimensional structure of fiber, is about 20 μm at most. Therefore, the ink droplets to be used for an image forming process need to be smaller than this size from the viewpoint of encouraging the applied ink and the recording medium to react with each other and become changed physically or chemically very quickly. From this point of view, the equivalent circle diameter of liquid ink droplets needs to be 10 μm or less for the purpose of the present invention. Preferably, it is between 0.5 and 5 μm.

One of the reasons why the ink-jet technology is required to have an improved fixing rate if using reactive ink for printing an image on plain paper is that the smallest ink droplet diameter that can be obtained by a state of art ink-jet recording process cannot be smaller than 20 to 30 μm. In other words, with an image recording process using an ink-jet method, the particle size of liquid droplets is greater than the average size of the pores of plain paper, which is a three-dimensional structure of fiber, and therefore it is believed that the particle size is too large and unsatisfactory to encourage the applied ink and the recording medium, which may typically be plain paper, to react with each other.

Mist (liquid droplet) generating methods that can be used for the purpose of the invention include a spray method, a method for generating mists by means an oscillation element such as a piezoelectric element, a method utilizing an orifice that is normally used in continuous type ink-jet recording processes and a method utilizing electrostatic granulation.

Ink mist is normally conveyed to a development region by an air flow. Such an air flow can be produced by means of a fan, one or more than one rotary blades or some other device. It is also possible to appropriately control the mist phenomenon by arranging a multi-stylus type electrode aperture in the development region. It is also possible to use mist repeatedly by providing a mechanism for collecting mist.

Mist can be electrically charged by an appropriate means such as a method of injecting an electric charge by means of electrodes or a corona discharge method.

Figure 4:
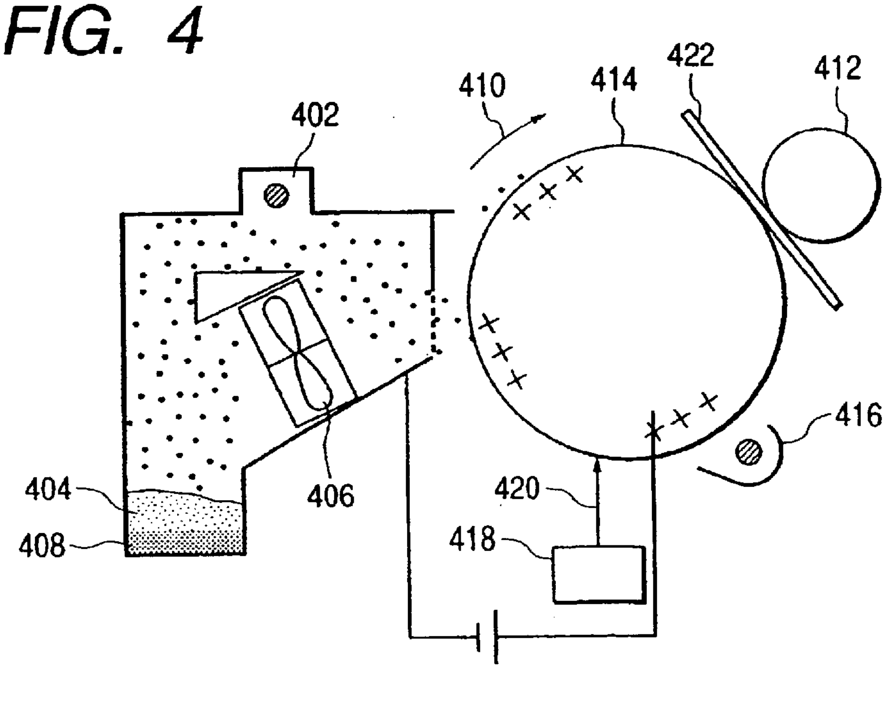
FIG. 4 is a schematic illustration of still another embodiment of an image forming process and that of an image forming apparatus according to the invention and adapted to indirect recording.

Now, the invention will be described in terms of utilizing an indirect recording method. FIG. 4 is a schematic illustration of still another embodiment of the image forming process and that of the image forming apparatus according to the invention and adapted to indirect recording. The embodiment of the apparatus illustrated in FIG. 4 has a configuration basically designed for an electrophotographic process. As shown in FIG. 4, the apparatus comprises a mist generating means 408 such as an ultrasonic mist generator. The apparatus additionally comprises a mist charger 402 for electrically charging the mist and a fan 406 for conveying the mist. The apparatus still additionally comprises a photosensitive drum 414 for forming an latent image, an electric charger 416 for electrically charging the photosensitive drum 414 and forming a latent image, a transfer mechanism 412 and a recording medium 422. In the image forming process of this apparatus, firstly the photosensitive drum is electrically charged by the electric charger and a latent image is formed on the photosensitive drum by means of an exposure unit 420. Then, the ink of the invention that is reduced to liquid droplets by the mist generator is electrically charged and mist produced from the mist generator is transferred to the latent image to develop the latent image into a visible image. The produced visible image is then transferred onto the recording medium by means of the transfer mechanism 412 and then fixed. According to the invention, the reactive agent may be sprayed not only to the image recording area on the photosensitive drum but to the entire surface of the photosensitive drum and made to react with the ink at the time of development in order to modify the latter. Then, the developed image is transferred onto the recording medium to achieve an excellent fixation effect.

Basically, while any ink that changes like the above described ink that is used for the direct recording method may be used also for the indirect recording method, it is necessary to select ink that can suitably be used for this method from the viewpoint of electric charge and development and processes it appropriately. In the case of the above embodiment, both the single liquid ink and two types of inks are applicable. In other words, the above described ink modification process may be realized by using either the single liquid ink or two types of inks. When two types of inks are used, the two types of inks may be developed and laid one on the other or one of then may be applied or sprayed to the entire surface of the recording medium so that the two types of inks may come into contact with each other on the recording medium.

For the purpose of the invention, mist (liquid droplets) may be generated by an appropriate method selected from spraying, the use of an oscillation element such as a piezoelectric element, the use of an orifice that is typically used for continuous ink-jet methods and the use of electrostatic granulation. For the purpose of the invention, mist can be conveyed to a development region by means of an air flow. An air flow can be produced by means of a fan, one or more than one rotary blade or some other device. It is also possible to appropriately control the misting phenomenon by arranging a multi-stylus type electrode aperture in the development region. It is preferable to use mist repeatedly by providing a mechanism for collecting mist. Mist can be electrically charged by an appropriate means such as a method of injecting an electric charge by means of electrodes or a corona discharge method. These methods are the same as those described above by referring to direct recording.

Any known indirect recording methods including those described above are compatible with an image forming process according to the invention. In other words, the present invention is applicable to various indirect recording methods including a method using an electrostatic latent image and a method using a magnetic latent image, such as an ion flow recording method, a method using an electric beam system and a magnetography recording method. In such case, an ink mist indirect recording method that can use small liquid droplets of mist can dramatically increase the surface area of a given volume of ink because of the reduced size of each liquid droplet as described earlier by referring to an ink mist direct recording method. This fact also gives rise to a remarkable effect for fixing the coloring material contained in the ink. If compared with fusion fixation of toners used for dry electrophotography and fixation through volatilization of solvent for wet electrophotography, the indirect recording method of this invention can be used to realize a high speed and energy saving image forming process, because it utilizes a physical change or chemical change along with mist of very small liquid droplets and also uses an ink reaction process for the fixation process. In order for the effect and the advantage of the indirect recording method to be very remarkable, an optimal droplet size needs to be selected for ink mist. While a smaller droplet size may be preferable from the viewpoint of increasing the surface area, there must be an optimal size that maximally encourages the applied ink and the recording medium to react with each other and positively participate in the fixing process. In reality, the use of popular plain paper as the recording medium is advantageous from the industrial point of view. The average size of the pores of plain paper, which is a three-dimensional structure of fiber, is about 20 μm at most. Therefore, the ink droplets to be used for an image forming process need to be smaller than this size from the viewpoint of encouraging the applied ink and the recording medium to react with each other and become changed physically or chemically very quickly. From this point of view, the equivalent circle diameter of liquid ink droplets needs to be 10 μm or less for the purpose of the present invention. Preferably, it is between 0.5 and 5 μm.

Ink of the Invention

Now, an ink of the invention that is used for a process and an apparatus according to the invention will be described below.

Roughly speaking, the present invention provides two types of inks. One is a single liquid type ink adapted to give rise to sol-gel modification or a reactive ink and the other is a multi-liquid type ink adapted to give rise to sol-gel modification or a reactive ink. Any physical or chemical process may be used for sol-gel modification for the purpose of the invention. Specific examples will be listed below.

Ink that can be used for the purpose of the invention includes the following:

(1) sol-gel transition ink, (2) ink containing a modified silicon or fluorine compound that is modified by a functional group referred to as polymerizable group or reactive group, (3) reactive ink characterized by transition from a sol state to a gel state where it contains silicon oxide or a metal oxide, and (4) ink containing polymer molecules having a polyvinylether structure and a stimuli responsive property.

Now, each of these types of ink will be described below.

(1) sol-gel transition ink

Thermal sol-gel transition ink can preferably be used as physically modifiable ink for the purpose of the invention. An ink material that is a low viscosity dispersion liquid in an ink mist head which is controlled preferably within the temperature range between 30C and 70° C. and can gel to become highly viscous when applied to a recording medium or an intermediary transfer medium for recording and cooled to room temperature can advantageously be used as the ink of this type. The ink of this type with such a property includes aqueous ink containing one or more than one dye or pigment and a water-dispersible or water-soluble polymer such as cellulose ether selected from hydroxylpropyl cellulose, hydroxylpropylmethyl cellulose, methyl cellulose and hydroxybutoxyl modified methyl cellulose/hydroxypropylmethyl cellulose, polyvinyl alcohol or polyvinyl acetal. Aqueous ink containing one or more than one dye or pigment and a nonionic surfactant with a site having a unit of polyoxyethylene or polyoxyalkylene along with an ionic surfactant to a small extent may also be used as the ink of this type.

A single liquid type alkaline ink that is chemically modifiable and contains one or more than one dye or pigment and a copolymer having a repeating unit of polyacrylic acid or polymethacrylic acid can be caused to gel when applied to acidic paper for recording. Ink that contains one or more than one dye or pigment and also a water-soluble or water-dispersible polymer having a functional group such as acrylic group or methacrylic group as part thereof can be caused to cross-link and gel by applying UV rays after it is applied to a recording medium for recording. A photopolymerization initiator and/or a radical trapping agent may be made to coexist in such ink.

Now, two-liquid sol-gel modification or reactive ink will be described. An example may be the use of water-soluble alkaline ink that contains one or more than one dye or pigment and a copolymer having a repeating unit of polyacrylic acid or polymethacrylic acid and can gel when acidic ink is added as a second ink. Another example may be the use of ink that contains one or more than one dye or pigment and a water-soluble or water-dispersible polymer having an epoxide functional group as part thereof and can cross-link to show an increased viscosity or to gel when ink containing one or more than one amine, organic acid and/or hydroxy group is added as a second ink. Still another example may be the use of an alkaline ink that contains one or more than one dye or pigment and molecules of polyacrylic acid, polymethacrylic acid or a copolymer having a repeating unit of acrylic acid or methacrylic acid and a second ink containing polyvalent metal ions or diamines.

As pointed out above, the use ink containing a polymer material that takes a major role for physical or chemical modification is preferable for the purpose of the invention. More preferably, the polymer is a block polymer. A block polymer maintains the structural characteristics of each block or each repeating unit and allows them to coexist and become exhibited. Particularly, the blocks or units having stimuli responsiveness operate effectively so that ink containing a block polymer is more effective than ink containing a random polymer. Known block polymers including acryl type and methacryl type block polymers, block polymers prepared from polystyrene and another polymer that may be an addition polymerization type or condensation polymerization type polymer and block polymers having blocks of polyoxyethylene or polyoxyalkylene can also be used for the purpose of the invention. In a preferable mode of carrying out the invention, a block polymer having a polyvinylether structure as will be described hereinafter is advantageously used.

For the purpose of this specification, stimuli responsiveness refers to a characteristic aspect of ink or some other composition whose property changes in response to various stimuli.

A block polymer that is used for the purpose of the invention preferably contains two or more than two different types of hydrophilic blocks. The expression of different types as used herein refers to different chemical structures in terms of the monomer structure of the polymer or the branch structure of the polymer chain and does not mean that only the length of the molecular chain of a single repeating unit varies in the polymer chain. The composition is modified when at least one of the two or more than two different types of hydrophilic blocks responds to a stimulus and becomes hydrophobic, for instance. Conversely, a type of hydrophobic blocks may respond to a stimulus and become hydrophilic to consequently modify the composition. For example, preferable polymers having a stimuli responsive property as defined above are such that the composition of ink of the invention contains a polymer having a plurality of types of blocks in which two or more types of blocks of the plurality of types are hydrophilic, at least one of the two or more types of blocks has a stimuli responsive property and at least one of the remaining types are constantly hydrophilic under operating conditions. In such a composition, when blocks having a stimuli responsive property that are hydrophobic under certain conditions and dispersed into a lowly viscous micelle state are subjected to a stimulus, they are modified to become hydrophilic to make polymer molecules associate so that the composition is modified from a lowly viscous state where polymers are dispersed to a highly viscous state of a polymer solution. In this way, the characteristics of the composition of the present invention change in response to a stimulus.

Alternatively, the composition according to the invention may be an aqueous composition and polymers are block polymers, of which those having a stimuli responsive property are hydrophilic under certain conditions. In such an aqueous composition, when blocks having a stimuli responsive property that are dissolved in aqueous solution are subjected to a stimulus, they are modified to become hydrophobic and the composition comes to show a micelle state to gel and drastically makes itself highly viscous.

Still alternatively, the composition according to the invention may contain block polymers having blocks of three different types including hydrophobic blocks A, blocks B having a stimuli responsive property and hydrophilic blocks C. With this arrangement, under conditions where blocks B having a stimuli responsive property behave as hydrophobic blocks and are dispersed in water, a dispersed micelle state containing blocks A and B as a core is changed to a micelle state containing A blocks as a core when B blocks are made hydrophilic in response to a stimulus to change the interaction of micelles and gel the composition. Then, as a result, the composition drastically becomes highly viscous.

When the composition contains hydrophilic blocks of two or more different types for the purpose of the invention, a highly favorable stimuli responsive property can be exhibited provided that water is used as a solvent.

From the viewpoint of the above described molecule design concept, preferable combinations of blocks of block polymers include AB type, ABA type, ABC type, ABCD type (where D represents a block different from A, B and C that may be hydrophilic or hydrophobic) and ABCA type.

Pigments that can be used for ink of the invention may be organic pigments or inorganic pigments. Preferably, black pigments and pigments of the three primary colors of cyan, magenta and yellow are used for ink of the invention, although pigments of other colors including neutral and pale pigments and metal gloss pigments may also be used. Pigments that are newly synthesized for the purpose of the invention may also be used.

Examples of black, cyan, magenta and yellow pigments that are commercially available are listed below.

Commercially available black pigments that can be used for the purpose of the invention include Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000ULTRA II, Raven 1190ULTRA II (available from Columbia Carbon), Black Pearls L, MOGUL-L, Regal 400R, Regal 660R, Regal 330R, Monarch 800, Monarch 880, Monarch 900, Monarch 1000, Monarch 1300, Monarch 1400 (available from Cabot), Color Black FW1, Color Black FW2, Color Black FW200, Color Black 18, Color Black S160, Color Black S170, Special Black 4, Special Black 4A, Special Black 6, Printex 35, Printex U, Printex 140U, Printex V, Printex 140V (available from Degussa), No. 25, No. 33, No. 40, No. 47, No. 52, No. 900, No. 2300, MCF-88, MA600, MA7, MA8, and MA100 (available from Mitsubishi Chemical Co.), but are not limited thereto.

Commercially available cyan pigments that can be used for the purpose of the invention include C. I. Pigment Blue—1, C. I. Pigment Blue—2, C. I. Pigment Blue—3, C. I. Pigment Blue—15, C. I. Pigment Blue—15 : 2, C. I. Pigment Blue—15 : 3, C. I: Pigment Blue —15: 4, C. I. Pigment Blue—16, C. I. Pigment Blue—22, and C. I. Pigment Blue—60, but are not limited thereto.

Commercially available magenta pigments that can be used for the purpose of the invention include C. I. Pigment Red—5, C. I. Pigment Red—7, C. I. Pigment Red—12, C. I. Pigment Red—48, C. I. Pigment Red—48 : 1, C. I. Pigment Red—57, C. I. Pigment Red—112, C. I. Pigment Red—122, C. I. Pigment Red—123, C. I. Pigment Red—146, C. I. Pigment Red—168, C. I. Pigment Red—184, C. I. Pigment Red—202, and C. I. Pigment Red—207, but are not limited thereto.

Commercially available yellow pigments that can be used for the purpose of the invention include C. I. Pigment Yellow—12, C. I. Pigment Yellow—13, C. I. Pigment Yellow—14, C. I. Pigment Yellow—16, C. I. Pigment Yellow—17, C. I. Pigment Yellow—74, C. I. Pigment Yellow—83, C. I. Pigment Yellow—93, C. I. Pigment Yellow—95, C. I. Pigment Yellow—97, C. I. Pigment Yellow—98, C. I. Pigment Yellow—114, C. I. Pigment Yellow—128, C. I. Pigment Yellow—129, C. I. Pigment Yellow—151, and C. I. Pigment Yellow—154, but not limited thereto.

Dyes can also be used as coloring agents for the purpose of the invention. Dyes that can be used for the purpose of the invention include direct dyes, acidic dyes, basic dyes, reactive dyes, water-soluble dyes to be used as coloring matters for food and dispersive dyes containing insoluble coloring matters.

Commercially available water-soluble dyes that can be used for the purpose of the invention include: C. I. Direct Black, −17, −19, −22, −32, −38, −51, −62, −71, −108, −146, −154; C. I. Direct Yellow, −12, −24, −26, −44, −86, −87, −98, −100, −130, −142; C. I. Direct Red, −1, −4, −13, −17, −23, −28, −31, −62, −79, −81, −83, −89, −227, −240, −242, −243; C. I. Direct Blue, −6, −22, −25, −71, −78, −86, −90, −106, −199; C. I. Direct Orange, −34, −39, −44, −46, −60; C. I. Direct Violet, −47, −48; C. I. Direct Brown, −109; C. I. Direct Green, −59, and other direct dyes; C. I. Acid Black, −2, −7, −24, −26, −31, −52, −63, −112, −118, −168, −172, −208; C. I. Acid Yellow, −11, −17, −23, −25, −29, −42, −49, −61, −71; C. I. Acid Red, −1, −6, −8, −32, −37, −51, −52, −80, −85, −87, −92, −94, −115, −180, −254, −256, −289, −315, −317; C. I. Acid Blue, −9, −22, −40, −59, −93, −102, −104, −113, −117, −120, −167, −229, −234, −254; C. I. Acid Orange, −7, −19; C. I. Acid Violet, −49, and other acidic dyes; C. I. Reactive Black, −1, −5, −8, −13, −14, −23, −31, −34, −39; C. I. Reactive Yellow, −2, −3, −13, −15, −17, −18, −23, −24, −37, −42, −57, −58, −64, −75, −76, −77, −79, −81, −84, −85, −87, −88, −91, −92, −93, −95, −102, −111, −115, −116, −130, −131, −132, −133, −135, −137, −139, −140, −142, −143, −144, −145, −146, −147, −148, −151, −162, −163; C. I. Reactive Red, −3, −13, −16, −21, −22, −23, −24, −29, −31, −33, −35, −45, −49, −55, −63, −85, −106, −109, −111, −112, −113, −114, −118, −126, −128, −130, −131, −141, −151, −170, −171, −174, −176, −177, −183, −184, −186, −187, −188, −190, −193, −194, −195, −196, −200, −201, −202, −204, −206, −218, −221; C. I. Reactive Blue, −2, −3, −5, −8, −10, −13, −14, −15, −18, −19, −21, −25, −27, −28, −38, −39, −40, −41, −49, −52, −63, −71, −72, −74, −75, −77, −78, −79, −89, −100, −101, −104, −105, −119, −122, −147, −158, −160, −162, −166, −169, −170, −171, −172, −173, −174, −176, −179, −184, −190, −191, −194, −195, −198, −204, −211, −216, −217; C. I. Reactive Orange, −5, −7, −11, −12, −13, −15, −16, −35, −45, −46, −56, −62, −70, −72, −74, −82, −84, −87, −91, −92, −93, −95, −97, −99; C. I. Reactive Violet, −1, −4, −5, −6, −22, −24, −33, −36, −38; C. I. Reactive Green, −5, −8, −12, −15, −19, −23; C. I. Reactive Brown, −2, −7, −8, −9, −11, −16, −17, −18, −21, −24, −26, −31, −32, −33, and other reactive dyes; C. I. Basic Black, −2; C. I. Basic Red, −1, −2, −9, −12, −13, −14, −27; C. I. Basic Blue, −1, −3, −5, −9, −24, −25, −26, −28, −29; C. I. Basic Violet, −7, −14, −27; and C. I. Food Black, −1, −2.

While the above listed coloring materials are particularly preferable for the ink of the invention, coloring materials that can be used for the ink of the invention are not limited to them.

The pigment content of the ink of the invention is preferably between 0.1 and 50 wt % with respect to the total weight of the ink. No sufficient image density can be obtained if the pigment content falls below 0.1 wt %, whereas the image fixability can become degraded if the pigment content exceeds 50 wt %. More preferably, the pigment content to be used for the ink of the invention is between 0.5 and 30 wt %. The dye content of the ink of the invention is preferably between 0.5 and 30 wt %. Normally, either pigments or dyes are used for the purpose of the invention, although both pigments and dyes may be used.

Furthermore, additives that can be used for ink of the invention include pH regulating agents adapted to stabilize the ink and the ink passages in the recording apparatus, penetrating agents that accelerate penetration of ink into the recording medium and drying of ink in appearance, anti-mold agents for preventing generation of mold in ink, chelating agents for blocking metal ions in ink and preventing deposition of metal in the nozzle section of the recording apparatus and deposition of insolubilities in ink, defoaming agents for preventing generation of foam during circulation and transfer of the recording liquid and during the operation of manufacturing recording liquid, anti-oxidants, viscosity regulating agents, electric conductivity imparting agents, UV absorbing agents and others as well as water-soluble dyes, dispersive dyes and oil-soluble dyes.

(2) ink containing a modified silicon or fluorine compound that is modified by a functional group referred to as polymerizable group or reactive group For the purpose of the invention, it is also possible to use ink containing a modified silicon or fluorine compound that is modified by a functional group that is referred to as polymerizable group or reactive group. For example, silicon oil ink or fluorine oil ink containing a modified silicon or fluorine compound having a functional group such as an acryl group, a methacryl croup, an epoxy group, an alkoxysilyl group or the like and dyes or pigments may be projected from an ink mist recording head as mist and subjected to a light irradiation reaction or an oxidative cross-linking reaction on an intermediary transfer medium or a recording medium so that ink may be modified by the reaction. If the reaction is conducted by the light irradiation reaction, irradiation of UV rays is a popular technique for inducing a photo-reaction. An oxidative cross-linking reaction can advantageously be conducted by utilizing oxygen contained in air or by positively spraying oxygen. Alternatively, acidic paper may be used as a recording medium to realize a neutralization reaction with alkaline ink. Still alternatively, a hydrolysis reaction may be conducted.

So-called reactive ink adapted to use two or more inks will be described below as another example.

Modified silicon oil that is modified by a functional group that is referred to as a polymerizable group or a reactive group can also be used in this example. Silicon oil ink or fluorine ink containing a compound having a functional group such as epoxy group, alkoxysilyl group, amino group or hydrosilyl group and containing dyes or pigments is used as a first ink and a reactive ink containing an acidic compound, a compound operating as a catalyst or a compound having a functional group such as amino group or hydroxy group is used as a second, third or further subordinate ink.

Ink of this type may contain a modified silicon or fluorine compound that is modified by a functional group referred to as a polymerizable group or a reactive group. For example, silicon oil ink or fluorine ink containing a compound having a functional group such as an acryl group, methacryl group, epoxy group, alkoxysilyl group or the like and also containing dyes or pigments may be projected from an ink mist recording head as mist onto an intermediary transfer medium or a recording medium and subjected to a light irradiation reaction or an oxidative cross-linking reaction on the intermediary transfer medium or the recording medium, whichever appropriate, so that the applied ink may be modified by the reaction. If the reaction is conducted by the light irradiation reaction, irradiation of UV rays is a popular technique for inducing a photo-reaction. An oxidative cross-linking reaction can advantageously be conducted by utilizing oxygen contained in air or by positively spraying oxygen. Alternatively, acidic paper may be used as a recording medium to realize a neutralization reaction with alkaline ink. Still alternatively, a hydrolysis reaction may be conducted.

So-called reactive ink adapted to use two or more than two inks will be described below as another example.

Modified silicon oil that is modified by a functional group that is referred to as a polymerizable group or a reactive group can also be used in this example. Silicon oil ink or fluorine ink containing a compound having a functional group such as epoxy group, alkoxysilyl group, amino group or hydrosilyl group and containing dyes or pigments is used as a first ink and a reactive ink containing an acidic compound, a compound operating as a catalyst or a compound having a functional group such as amino group or hydroxy group is used as a second, third or further subordinate ink.

Additives may be added to the single liquid ink and the ink using two or more different types of inks as described above. Additives that can be used for the purpose of the invention include hydrophilic solvents, hydrophobic solvents, surface active agents and stabilizing agents.

Any of the pigments and the dyes described above for type (1) may also advantageously be used for the ink of this type. The pigment content of the ink of the invention is preferably between 0.1 and 50 wt % with respect to the total weight of the ink. Sufficient image density cannot be obtained if the pigment content falls below 0.1 wt %, whereas the image fixability can be degraded if the pigment content exceeds 50 wt %. More preferably, the pigment content to be used for ink of the invention is between 0.5 and 30 wt %. The dye content of the ink of the invention is preferably between 0.5 and 30 wt %. Normally, either pigments or dyes are used for the purpose of the invention, although both pigments and dyes may be used.

Furthermore, additives that can be used for the ink of the invention include pH regulating agents adapted to stabilize ink and the ink passages in the recording apparatus, penetrating agents that accelerate penetration of ink into the recording medium and drying of ink in appearance, anti-mold agents for preventing generation of mold in ink, chelating agents for blocking metal ions in ink and preventing deposition of metal in the nozzle section of the recording apparatus and deposition of insolubilities in ink, defoaming agents for preventing generation of foam during circulation and transfer of the recording liquid and during the operation of manufacturing the recording liquid, anti-oxidants, viscosity regulating agents, electric conductivity imparting agents, UV absorbing agents and others as well as water-soluble dyes, dispersive dyes and oil-soluble dyes.

Currently, ink droplets that are used in ink-jet systems have a diameter as small as 20 to 30 μm and hence the surface area of a unit weight of the ink is very large. This means that, if the ink is an oily ink and inflammable, it provides a very high risk of inflammation or ignition. In view of these circumstances, it is preferable to use silicon oil or fluorine oil as a solvent. An image forming process and an image forming apparatus according to the invention can be very advantageous in terms of safety and environment protection when such hardly inflammable or nonflammable ink is used as the image forming agent. Thus, the present invention provides great advantages from the viewpoint of industry. Particularly, when silicon oil is used, an image forming process according to the invention is a high performance method because silicon oil is hardly volatile or nonvolatile and hence can be used safely in an office environment. Thus, the present invention provides an image forming process and an image forming apparatus that is ecologically and environmentally friendly to meet the environmental requirements that need to be currently met.

(3) reactive ink characterized by transition from a sol state to a gel state where it contains silicon oxide or a metal oxide For the ink of this type, acidic or alkaline, water-dispersive or water-soluble ink containing dyes or pigments may be used as a first ink while an alcohol solution containing alkoxysilane may be used as a second ink. A hydrolytic reaction proceeds when these two types of ink are brought into contact with each other by way of the above described process to consequently modify the silicon oxide to shift it from a sol state to a gel state. As the reaction progresses, the applied ink dramatically increases its viscosity and quickly becomes fixed. The first ink preferably contains a surface active agent, a pigment dispersing agent and other additives from the viewpoint of adsorption of silicon oxide. Alkoxysilane contained in the second ink may be a compound such as alkoxyitanium or alkoxytin. If such is the case, a sol state and a gel state of such a metal oxide are utilized for the purpose of the invention. It should be noted that the above arrangement is described only as an example and the first ink may be made to contain alkoxysilane and/or the second ink may be made to contain an acid such as hydrochloric acid. A third or subordinate ink may also be used. In short, it is important to control the inking process in such a way that silicon oxide or metal oxide is produced and a sol state and a gel state are exhibited.

Any of the pigments and the dyes described above for type (1) may also advantageously be used for the ink of this type. The pigment content of the ink of the invention is preferably between 0.1 and 50 wt % with respect to the total weight of the ink. Sufficient image density cannot be obtained if the pigment content falls below 0.1 wt %, whereas the image fixability can be degraded if the pigment content exceeds 50 wt %. More preferably, the pigment content to be used for the ink of the invention is between 0.5 and 30 wt %. The dye content of the ink of the invention is preferably between 0.5 and 30 wt %. Normally, either pigments or dyes are used for the purpose of the invention, although both pigments and dyes may be used.

Furthermore, additives that can be used for ink of the invention include pH regulating agents adapted to stabilize ink and the ink passages in the recording apparatus, penetrating agents that accelerate penetration of ink into the recording medium and drying of ink in appearance, anti-mold agents for preventing generation of mold in ink, chelating agents for blocking metal ions in ink and preventing deposition of metal in the nozzle section of the recording apparatus and deposition of insolubilities in ink, defoaming agents for preventing generation of foam during circulation and transfer of the recording liquid and also during the operation of manufacturing recording liquid, anti-oxidants, viscosity regulating agents, electricity conducting agents, UV absorbing agents and others as well as water-soluble dyes, dispersive dyes and oil-soluble dyes.

(4) ink containing polymer molecules having a polyvinylether structure and a stimuli responsive property A polymer having a polyvinylether structure can be used to provide ink with a stimuli responsive property. While aqueous substances containing dispersoid can advantageously be used for the purpose of the invention, the polymer contained in such a substance preferably exhibits a functional feature of stabilizing the dispersiveness of such substances that typically contain pigments as dispersoid. Therefore, polyvinyl ether to be used for the purpose of the invention preferably have an amphiphilic structure having both a hydrophilic part and a hydrophobic part in it. Particularly, block polymers can advantageously be used for the purpose of the invention for the above identified reasons. Since polymers having a polyvinyl structure generally have a low glass transition temperature and are soft, the hydrophobic part thereof reveals affinity for granular solids since the hydrophobic part thereof is normally liable to cause entanglement with such solids. Therefore, such polymers have dispersion characteristics that are particularly favorable for the purpose of the invention.

Many methods for synthetically preparing a polymer having a polyvinylether structure have hitherto been reported. They include the method disclosed in Japanese Patent Application Laid-Open No. 11-080221 and those that involve cationic living polymerization as reported by Aoshima et al. in Japanese Patent Applications Laid-Open Nos. 11-322942 and 11-322866. Various polymers including homopolymers, copolymers formed from two or more component monomers, block polymers, graft polymers and graduation polymers can be synthetically prepared with an accurately unified length (molecular weight) by means of cationic living polymerization. Additionally, various functional groups can be introduced to the side chains of polyvinylether. Cationic polymerization may also be conducted in an $HI/I_2$ or $HCl/SnCl_4$ system.

While the primary objective of using a polymer having a polyvinylether structure for the purpose of the invention is to provide ink with a stimuli responsive property by adding it, it is also possible to provide ink with other functional features (e. g., dispersiveness for granular solids such as pigments) by adding it.

While no limitations are imposed to stimuli that can be applied to an aqueous substance containing dipsersoid including a polymer having a polyvinylether structure, water and granular solids according to the invention, preferable stimuli include exposure to an electromagnetic wave, application of an electric field, a temperature change, a pH change, addition of chemicals, a change in the density of the aqueous dispersion and irradiation of electron beams. More preferable stimuli include exposure to an electromagnetic wave, a temperature change, a pH change and a change in the density of the aqueous dispersion. As far as this specification is concerned, exposure to an electromagnetic wave means that the aqueous dispersion is exposed to ultraviolet rays, visible light and/or infrared rays.

Now, typical stimuli that can be used for the purpose of the invention will be described and examples of polymers having a polyvinylether structure and adapted to respond to such stimuli will be listed below.

Responses to a temperature change that is given as a stimulus include changes in the aqueous dispersion such as a change in the solubility, a change in the thermal polymerization performance, a polarity change and a phase transition (sol-gel transition, liquid crystal). The range of temperature change preferably covers both the upper and lower sides of the phase transition temperature of the aqueous substance containing a polymer having a polyvinylether structure, water and dispersoid such as pigments and more preferably covers both the upper and lower sides of the critical gelling temperature. Examples of polyvinylether structures that respond to a stimulus of temperature change include alkoxyvinylether derivatives such as poly(2-methoxyethylvinylether) and poly(2-ethoxyvinylether) and copolymers formed by using such polymeric compounds as principal ingredients. Particularly, a block copolymer formed from poly((2-methoxyethylvinylether)-b-(2-ethoxyethylvinylether)) rapidly changes its viscosity at 20C. Note that “b” in poly((2-methoxyethylvinylether)-b-(2-ethoxyethylvinylether)) refers to a block polymer.

As for the stimulus of exposure to an electromagnetic wave, the range of wavelength of the electromagnetic wave is preferably between 100 and 800 nm. Responses to exposure to an electromagnetic wave can be observed in terms of solubility, photopolymerization and/or photochromism, photoisomerization, photodimerization and phase transition (sol-gel transition, liquid crystal). Examples of polyvinylether structures that respond to a stimulus of this type include vinylether derivatives having a polymerizing function group such as poly(2-vinyloxyethylmethacrylate) and copolymers formed by using such polymeric compounds as principal ingredients.

As for responses to a stimulus of pH change, the aqueous dispersion preferably responds within a pH range between 3 and 12. Responses to a stimulus of pH change include those in terms of solubility, a hydrogen bond, a coordinate bond, a polarity change and phase transition (sol-gel transition, liquid crystal). Examples of polyvinylether structures that respond to a stimulus of this type include copolymers and blend polymers formed from an alkoxyvinylether derivative such as poly(2-methoxyethylvinylether) or poly(2-ethoxyethylvinylether) and a polycarboxylic acid such as polymethacryl acid.

Other examples of stimuli that can be used for the purpose of the invention include a density change of the aqueous dispersion. For example, such a density change of the aqueous dispersion can occur as a result of evaporation or absorption of water in the aqueous dispersion or a change in the density of the polymers dissolved in the aqueous dispersion. As for the stimulus of density change, the density changes preferably within a range that covers both the upper and lower sides of the phase transition density and more preferably within a range that covers both the upper and lower sides of the critical phase transition density. Examples of responses to a stimulus of density change include those in terms of a hydrogen bond, a hydrophobic interaction and a phase transition (sol-gel transition, liquid crystal). Examples of polyvinylether structures that respond to a stimulus of this type include alkoxyvinylether derivatives such as poly(2-methoxyethylvinylether) and poly(2-ethoxyethylvinylether), aryloxyvinylether derivatives such as poly(2-phenoxyethylvinylether) and copolymers formed from any of these polymer compounds as principal ingredients.

Two or more of the above listed types of stimuli may be combined for the purpose of the invention.

While the polymer structure including the polyvinyl ether structure in the aqueous dispersion containing polymer molecules having a polyvinylether structure, water and granular solids may be that of a homopolymer, it is preferably that of a copolymer formed from two or more ingredients of vinylethers from the viewpoint of optimizing the physical properties of the polymer. More preferably, the copolymer is in the form of a block polymer, graft polymer or graduation polymer from the viewpoint of causing the stimuli responsive property of each of the ingredient monomers of the polymer to be exhibited maximally.

Polymers containing such a polyvinylether structure preferably have a repeating unit structure expressed by the general formula of (1) below.

$$-(CH_2-CH\ (OR^1)\ )- \qquad (1)$$

In the above formula, $R^1$ is selected from a straight chain, branched or cyclic alkyl group with 1 to 18 carbon atoms, Ph, pyridyl (Pyr), Ph-Ph, Ph-Pyr, or $-(CH(R^2)-CH(R^3)-O)_l-R^4$ or $-(CH_2)_m-(O)_n-R^4$ and the hydrogen in the aromatic ring can be substituted by a straight chain or branched alkyl group with 1 to 4 carbon atoms, while the carbon in the aromatic ring can be substituted by nitrogen. I represents an integer between 1 and 18 and m represents an integer between 1 and 36, while n represents 0 or 1. Each of $R^2$ and $R^3$ is independently either H or $CH_3$ and $R^4$ is selected from hydrogen, a straight chain, branched or cyclic alkyl group with 1 to 18 carbon atoms, Ph, Pyr, Ph-Ph, Ph-Pyr, —CHO, $-CO-CH{=}CH_2$ and $-CO-C(CH_3){=}CH_2$. If $R^4$ group is other than hydrogen, the hydrogen bonded to each carbon atom of $R^4$ can be substituted by a straight chain or branched alkyl group with 1 to 4 carbon atoms, F, Cl or Br and the carbon in the aromatic ring can be substituted by nitrogen.

In the above definitions of $R^1$ through $R^4$ groups, an alkyl group refers to a methyl, ethyl, propyl, n-butyl, sec-butyl, t-butyl, pentyl, hexyl, heptyl, octyl, nonyl, decyl, dodecyl or octadecyl group or the like and a cyclic alkyl group refers to a cyclopropyl, cyclobutyl, cyclopentyl, cyclohexyl or cyclooctyl group or the like. For the purpose of the invention, when the hydrogen bonded to a carbon in the $R^1$ through $R^4$ groups is substituted, a single substituent or two or more substituents may be used. If two or more substituents are used, they may be identical or different from each other.

For advantageously obtaining aqueous dispersions having a stimuli responsive property as described above, a polymer having a polyvinylether structure and a repeating unit structure expressed by the general formula of (2) below is preferably used.

$$-(CH_2-CH\ (OR^5))- \qquad (2)$$

In the above formula, R5 is selected from a straight chain, branched or cyclic alkyl group with 1 to 18 carbon atoms, Ph, Pyr, Ph-Ph, Ph-Pyr, or $-(CH_2-CH_2-O)_l-R^6$ or $-(CH_2)_m-(O)_n-R^6$ and the hydrogen in the aromatic ring can be substituted by a straight chain or branched alkyl group with 1 to 4 carbon atoms, while the carbon in the aromatic ring can be substituted by nitrogen. 1 represents an integer between 1 and 18 and m represents an integer between 1 and 36, while n represents 0 or 1. $R^6$ is selected from H, a straight chain, branched or cyclic alkyl group with 1 to 18 carbon atoms, Ph, Pyr, Ph-Ph, Ph-Pyr, —CHO, $-CO-CH{=}CH_2$ and $-CO-C(CH_3){=}CH_2$. If $R^6$ group is other than hydrogen, the hydrogen bonded to each carbon atom of $R^6$ can be substituted by a straight chain or branched alkyl group with 1 to 4 carbon atoms, F, Cl or Br and the carbon in the aromatic ring can be substituted by nitrogen. In the above definitions of $R^5$ and $R^6$ groups, an alkyl group refers to a methyl, ethyl, propyl, n-butyl, sec-butyl, t-butyl, pentyl, hexyl, heptyl, octyl, nonyl, decyl, dodecyl or octadecyl group or the like and a cyclic alkyl group refers to a cyclopropyl, cyclobutyl, cyclopentyl, cyclohexyl or cyclooctyl group or the like. For the purpose of the invention, when the hydrogen bonded to a carbon in the $R^5$ and $R^6$ groups is substituted, a single substituent or two or more substituents may be used. If two or more substituents are used, they may be identical or different from each other.

The structures of monomers and polymers that can preferably be used for the purpose of the invention are listed below. However, it should be noted that polyvinylether structures that can be used for the purpose of the invention are not limited to them.

(I-a)

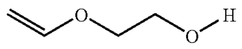

(I-b)

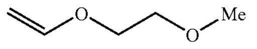

(I-c)

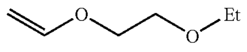

(I-d)

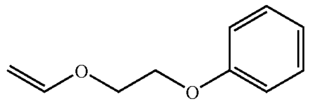

-continued (I-e)

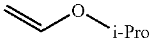

(I-f)

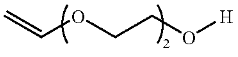

(I-g)

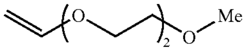

(I-h)

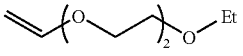

(I-i)

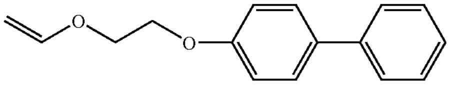

(I-j)

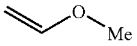

(I-k)

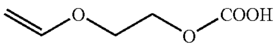

(I-l)

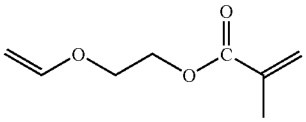

(I-m)

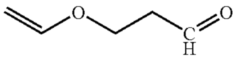

(I-n)

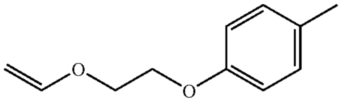

(I-o)

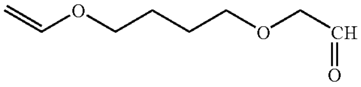

(II-a)

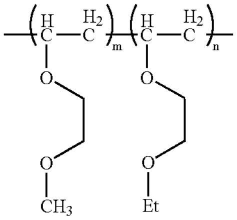

(II-b)

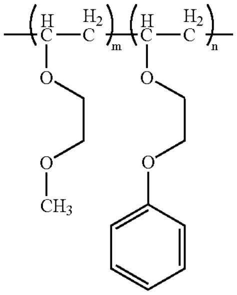

-continued (II-c)

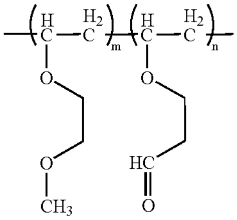

(II-d)

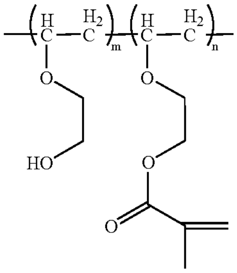

(II-e)

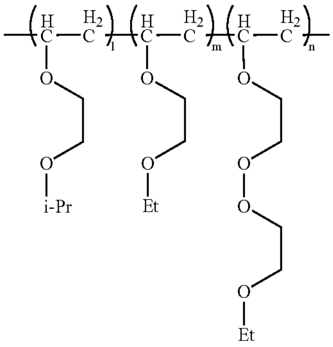

(II-f)

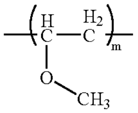

Additionally, the numbers of repeating units of polyvinylether (m, n and 1 in the above formulas (II-a) to (II-f)) are preferably and independently between 1 and 10,000. The total thereof is preferably between 10 and 20,000 ((m+n+l) in the above formulas (II-a) to (II-f)) and the number average molecular weight is preferably between 500 and 20,000,000. The number average molecular weight is more preferably between 1,000 and 5,000,000 and most preferably between 2,000 and 2,000,000. The above listed polyvimylethers may be graft-bonded to some other polymer or copolymerized with some other repeating unit structure.

The ink of the invention can be used as an aqueous ink. Water to be used for the aqueous ink according to the invention is preferably ion-exchange water from which metal ions are removed, pure water or super pure water. The ink of the invention preferably contains water by 20 to 95 wt %, preferably between by 30 to 90 wt %. Either pigments or dyes can be used as the coloring material for the ink of the invention. The content of the coloring material is between 0.5 and 30 wt % with respect to the total weight of the ink.

Examples of the ink of the invention are described above. However, the present invention is by no means limited thereto.

Pigments are preferably used for the ink of the invention.

Pigments that are used for the ink of the invention may be organic pigments and/or inorganic pigments. Preferably, black pigments and pigments of the three primary colors of cyan, magenta and yellow are used for the ink of the invention, although pigments of other colors including neutral and pale pigments and metal gloss pigments may also be used. Pigments that are newly synthesized for the purpose of the invention may also be used.

Commercially available black, cyan, magenta and yellow pigments as listed in (1) above can suitably be used for the ink of the invention.

The pigment content of the ink of the invention is preferably between 0.1 and 50 wt % with respect to the total weight of the ink. Sufficient image density cannot be obtained if the pigment content falls below 0.1 wt %, whereas the image fixability can become degraded if the pigment content exceeds 50 wt %. More preferably, the pigment content to be used for ink of the invention is between 0.5 and 30 wt %.

Whenever necessary, various additives and auxiliaries may be added to ink of the invention.

Additives that can be used for aqueous dispersion ink include dispersion stabilizers that can disperse pigments in the solvent on a stable basis. While the ink of the invention has a function of dispersing pigments by means of a polymer having a polyvinylether structure, some other dispersion stabilizers may be added if the pigment dispersibility of the ink is not sufficient without such an additive. Resins having both a hydrophilic part and a hydrophobic part or a surface active agent may be used as an additional additive.

Examples of resins having both a hydrophilic part and a hydrophobic part include copolymers of a hydrophilic monomer and a hydrophobic monomer. Examples of hydrophilic monomers that can be used for the purpose of the invention include acrylic acid, methacrylic acid, maleic acid, fumaric acid, monoesters of the above-listed carboxylic acids, vinylsulfonic acid, styrenesulfonic acid, vinyl alcohol, acryl amide and methacryloxyethylphosphate. Examples of hydrophobic monomers that can be used for the purpose of the invention include styrene, styrene derivatives such as α-methylstyrene, vinylcyclohexane, vinylnaphthalene derivatives, esters of acrylic acid and esters of methacrylic acid. Copolymers that can be used for the purpose of the invention include random copolymers, block copolymers and graft copolymers. Note that hydrophilic and hydrophobic monomers that can be used for the purpose of the present invention are not limited to those listed above.

Surface active agents that can be used for the purpose of the invention include anionic surfactants, nonionic surfactants, cationic surfactants and ampho-ionic surfactants.

Examples of anionic surfactants include fatty acid esters, alkylsulfates, alkylarylsulfates, alkyldiaryletherdisulfates, dialkylsulfosuccinates, alkylphosphates, naphthalene sulfonic acid formalin condensates, polyoxyethylenealkylphosphates and glycerolborate fatty acid esters.

Examples of nonionic surfactants include polyoxyethylenealkylethers, polyoxyethleneoxypropylene block copolymer, sorbitol fatty acid esters, glycerin fatty acid esters, polyoxyethylene fatty acid esters, polyoxyethylenealkylamines, fluorine type surfactants and silicon type surfactants.

Examples of cationic surfactants include alkylamine salts, quaternary ammonium salts, alkylpyridium salts and alkylimidazolium salts.

Examples of ampho-ionic surfactants include alkylbetaine, alkylamine oxides and phosphatidylcholine. Note that surface active agents that can be used for the purpose of the present invention are not limited to those listed above.

Whenever necessary, an aqueous solvent can be added to the ink of the invention. Particularly, when the ink of the invention is used for an ink-jet system, such an aqueous solvent is used to prevent ink from drying at the nozzles and becoming solidified. A mixture of more than two solvents may be used for the purpose of the invention. The solvent content of the ink of the invention is between 0.1 and 60 wt %, preferably between 1 and 25 wt % of the ink.

Examples of aqueous solvents that can be used for the purpose of the invention include polyhydric alcohols such as ethyleneglycol, diethyleneglycol, triethyleneglycol, polyethyleneglycol, propyleneglycol, polypropyleneglycol and glycerol, polyhydric alcohol ethers such as ethyleneglycolmonomethylether, ethyleneglycolmonoethylether, ethyleneglycolmonobutylether, diethyleneglycolmonoethylether and diethyleneglycolmonobutylether and nitrogen-containing solvents such as N-methyl-2-pyrrolidone, substituted pyrrolidone and triethanol amine. Furthermore, monohydric alcohols such as methanol, ethanol and isopropyl alcohol can be used for the purpose of acceleration of the drying process of ink on paper.

Other additives that can be used for the purpose of the invention include pH regulators that can stabilize ink and the ink passages in the recording apparatus, anti-mold agents for preventing generation of mold in ink, chelating agents for blocking metal ions in ink and preventing deposition of metal in the nozzle section of the recording apparatus and deposition of insoluble materials in ink, defoaming agents for preventing generation of foam during circulation and transfer of the recording liquid and during the operation of manufacturing recording liquid, anti-oxidants, viscosity regulating agents, electric conductivity imparting agents, UV absorbing agents and others as well as water-soluble dyes, dispersive dyes and oil-soluble dyes.

The present invention also provides a liquid droplet recording ink containing the ink of the invention.

The ink of the invention can suitably be used for an image forming apparatus and an image forming process according to the invention. For example, it may be used with a head using a piezoelectric element as described in Japan Hard Copy '99 Treatises, p. 343 or a field control type aperture head that may be one described in Japanese Patent Application Laid-Open No. 58-215671 or Japanese Patent Application Laid-Open No. 2000-66522 or a toner jet type head T-Fax (tradename, available from Telecom Germany). The ink of the present invention can suitably be applied to an image forming process according to the invention and also to an image forming process adapted to use such an apparatus.

The present invention also provides a liquid droplet ejecting and projecting method. A liquid droplet ejecting and projecting method according to the invention can suitably be used for ejecting and projecting mist containing liquid droplets of the above described size. For example, it may be used with a head using a piezoelectric element as described in Japan Hard Copy '99 Treatises, p. 343 or a field control type aperture head that may be one described in Japanese Patent Application Laid-Open No. 58-215671 or Japanese Patent Application Laid-Open No. 2000-66522 or a toner jet type head T-Fax (tradename, available from Telecom Germany).

Methods for generating liquid droplets for the purpose of the invention include a spray method, a method for generating mists by means of an oscillation element such as a piezoelectric element, a method utilizing an orifice that is normally used in continuous type ink-jet recording processes and a method utilizing electrostatic granulation. Liquid droplets are normally conveyed to a development region by an air flow. Such an air flow can be produced by means of fans, rotary blades or some other device. It is also possible to appropriately control the misting phenomenon by arranging a multi-stylus type electrode aperture in the development region. It is also possible to use mist repeatedly by providing a mechanism for collecting mist.

Liquid droplets can be electrically charged by an appropriate means such as a method of injecting an electric charge by means of electrodes or a corona discharge method. A liquid droplet ejecting and projecting method according to the invention can be used for direct recording.

A liquid droplet ejecting and projecting method according to the invention can also be used for the indirect recording method. While it is necessary to select ink materials that can suitably be used for the indirect method from the viewpoint of electric charge and development and be processed appropriately, inks that exhibit the basically same change as in the ink adapted to the direct recording method may also be used for the indirect recording method. Now, the invention will be described further by way of examples. However, it should be noted that the present invention is by no means limited to the examples.

EXAMPLE 1

Figure 5:
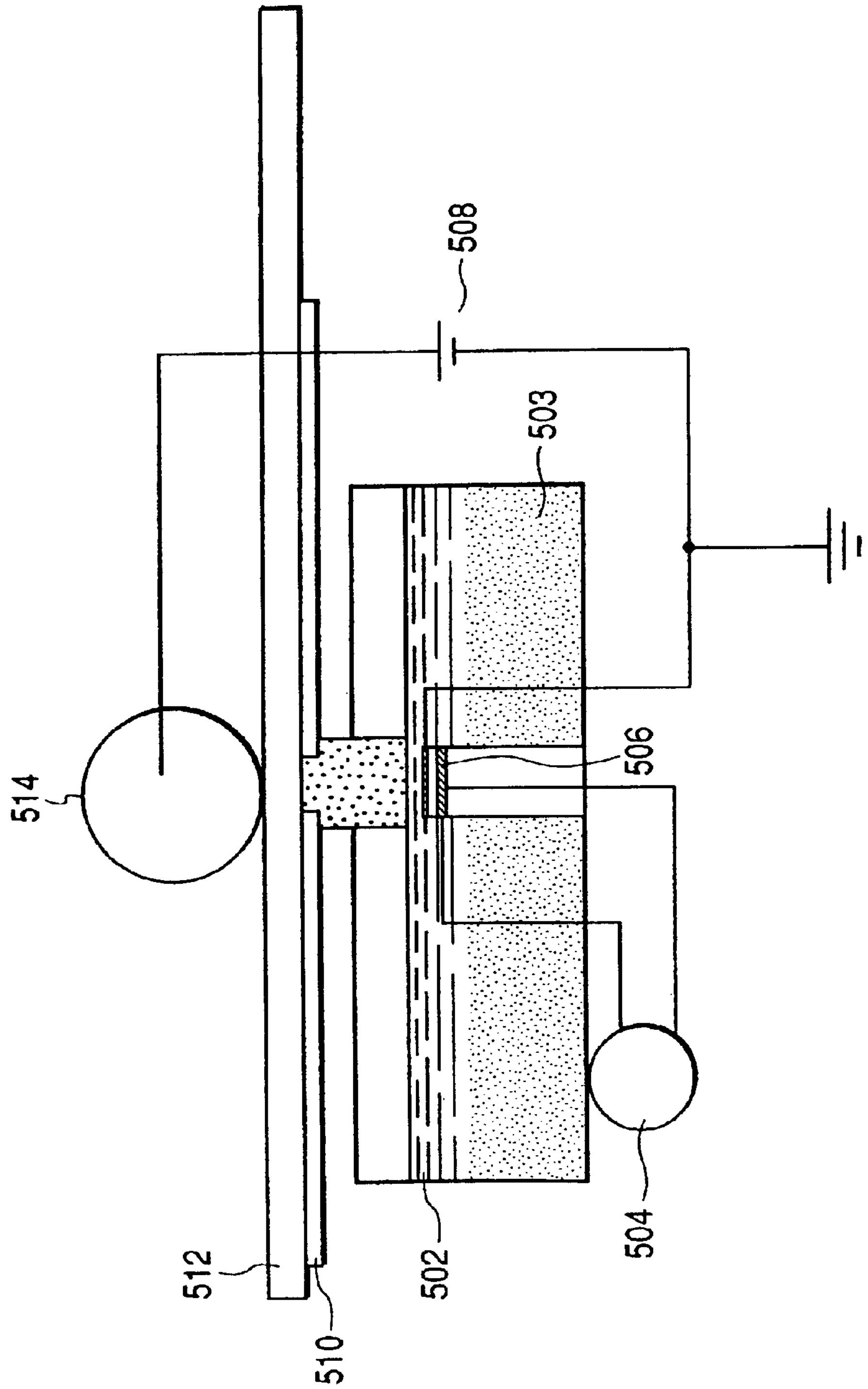
FIG. 5 is a schematic illustration of still another embodiment of an image forming apparatus according to the invention.

An image forming apparatus having a basic configuration illustrated in FIG. 5 was used. An ink pool 502 was filled with an ink 503. A piezoelectric ultrasonic mist generating device 506 having a diameter of 100 μm was arranged in the ink pool. In FIG. 5, there are also shown an insulating thin film glass substrate 510 that is 80 μm thick and provided with a recording hole having a diameter of 50 μm, a sheet of plain paper 512 being a recording medium and a counter electrode 514. The piezoelectric ultrasonic mist generating device 506 was connected to a drive power source 504. A bias voltage 508 was applied to the piezoelectric ultrasonic mist generating device 506 and the counter electrode 514. When a second ink, which will be described hereinafter, was oscillated at a frequency of 300 kHz by means of the piezoelectric ultrasonic mist generating device, the equivalent circle diameter of the generated liquid droplets was found to be 3 μm as observed through an optical microscope. The mist that had passed through the recording hole of the thin film glass substrate 510 adhered to the recording medium 512 for recording. The piezoelectric ultrasonic mist generating device and the counter electrode were disposed apart from each other by a distance of 0.7 mm and a bias voltage of 1,000V was applied to them. As a first ink, 2N aqueous solution of hydrochloric acid was sprayed onto the recording medium by means of a piezoelectric ultrasonic mist generating device similar to the device 506 shown in FIG. 5. Subsequently, as the second ink, an ink prepared by mixing 30 parts by weight of dispersant that was styrene acrylic acid ethylacrylate (acid value: 350, average molecular weight: 3,000, solid content density: 20 wt % aqueous solution, neutralizing agent: KOH), 20 parts by weight of MOGUL L (tradename, available from Cabot) and 50 parts by weight of water was filled in the device of FIG. 5 and used for recording an image on the recording medium that had been treated by the first ink. Immediately after the recording operation, another blank sheet of plain paper was pressed against the recorded side of the recording medium by applying a load of 2.5 $10^4$N/$m^2$ and the blank plain paper was visually checked for transfer of ink, thereby finding that no transfer of color had taken place at all. The ink was equally fixed when a bias voltage of 500V was applied. When observed through an optical microscope, it was found that the area recorded by mist generated by applying a bias voltage of 500V was about ⅓ of the area recorded by mist generated by applying a bias voltage of 1,000. The gradation expression was also better when a bias voltage of 500V was used. When the recorded area was observed carefully through an optical microscope, there were found projections of the gelled polymer. Gel was produced when a small amount of the first ink and the second ink were mixed with each other.

EXAMPLE 2

A similar recording operation was conducted by using the apparatus of FIG. 5 and a sheet of an OHP film for electrophotography available from 3M as a recording medium and the obtained image was immediately transferred onto a sheet of plain paper. Fixability that was as good as in Example 1 was confirmed.

EXAMPLE 3

An indirect recording apparatus as shown in FIG. 4 was prepared by using a piezoelectric ultrasonic mist generating device as shown in FIG. 5. The first ink as used in Example 1 was filled in the apparatus and the recorded image was developed on a sensitized sheet to be used for electrophotography. Then, the obtained image was transferred on a recording medium, which was a sheet of plain paper, and subsequently the second ink of Example 1 was sprayed onto the recording medium by means of an ultrasonic mist generating device. Another blank sheet of plain paper was pressed against the recorded side of the recording medium by applying a load of 2.5×$10^4$N/$m^2$ and the blank plain paper was visually checked for transfer of ink, thereby finding that no transfer of color had taken place at all.

EXAMPLE 4

Synthetic preparation of AB diblock polymer formed from MOVE and EOVE preparation of monomers: Monomers were prepared as in Example 1.

synthetic preparation of AB diblock polymer: The inside of a glass container equipped with a three-way cock was replaced by nitrogen and then the adsorbed water was removed from the inside by heating the inside of the container to 250° C. in the nitrogen atmosphere. After cooling the system to room temperature, 12 millimoles of MOVE, 16 millimoles of ethylacetate, 0.1 millimoles of 1-isobutoxyethylacetate and 11 ml of toluene were put into the container. When the temperature of the system reached 0° C., 0.2 millimoles of ethylaluminumsesquinochloride was added to initiate a polymerization process for synthetically preparing the A component of the AB block polymer. During the polymerization process, the molecular weight was monitored on a time division basis by means of gel permeation chromatography (GPC). After the completion of the polymerization process for producing the A component, 12 millimoles of EOVE was added as the B component for the subsequent polymerization. The polymerization reaction was terminated by adding 0.3 wt % ammonia/methanol solution into the system. Dichloromethane was added to the mixed solution in which the reaction had been terminated for the purpose of dilution and the obtained polymerization product was washed three times with 0.6N hydrochloric acid solution and then three times with distilled water. Then, the polymerization product was condensed, dried and solidified by means of an evaporator and subsequently dried in vacuum to obtain the intended chemical compound of the MOVE-EOVE diblock polymer. The chemical compound was identified by means of NMR and GPC, both of which provided a satisfactory spectrum (Mn=$2.5\times10^4$, Mn/Mw =1.3).

MOVE is an abbreviation of 2-methoxyethylvinylether.

EOVE is an abbreviation of 2-ethoxyethylvinylether.

<Image formation>

An image forming apparatus having a basic configuration as shown in FIG. 5 was used in this example as in Example 1. When a second ink, which will be described hereinafter, was oscillated at a frequency of 300 kHz by means of the piezoelectric ultrasonic mist generating device, the equivalent circle diameter of the generated liquid droplets was found to be 3 μm as observed through an optical microscope. The mist that had passed through the recording hole of the thin film glass substrate adhered to the recording medium for recording. The piezoelectric ultrasonic mist generating device and the counter electrode were disposed apart from each other by a distance of 0.7 mm and a bias voltage of 1,000V was applied to them. A 0.3N aqueous solution of hydrochloric acid was sprayed onto the recording medium by means of a piezoelectric ultrasonic mist generating device similar to the device 506 shown in FIG. 5. Subsequently, as the ink, an ink prepared by mixing a dispersing agent of 2 parts by weight of styrene acrylic acid ethylacrylate (acid value: 350, average molecular weight: 3,000, solid content density: 20 wt % aqueous solution, neutralizing agent: KOH) and 4 parts by weight of the polyvinylether block polymer prepared as above with 6 parts by weight of MOGUL L (tradename, available from Cabot), 60 parts by weight of water and 10 parts by weight ethylene glycol was filled in the device of FIG. 5 and used for recording an image on the recording medium that had previously been treated. Immediately after the recording operation, another blank sheet of plain paper was pressed against the recorded side of the recording medium by applying a load of 2.5 $10^4$N/$m^2$ and the blank plain paper was visually checked for transfer of ink, thereby finding that no transfer of color had taken place at all. The ink was equally fixed when a bias voltage of 500V was applied. When observed through an optical microscope, it was found that the area recorded by mist generated by applying a bias voltage of 500V was about ½ of the area recorded by mist generated by applying a bias voltage of 1,000 V. The gradation expression was also excellent when a bias voltage of 500V was used. When the recorded area was observed carefully through an optical microscope, there were found projections of the gelled polymer. Gel was produced when a small amount of the first ink and the second ink were mixed with each other. It may be assumed that the gelling took place due to two effects including an effect that the solvent density in the ink was reduced on the recording medium when the solvent was volatilized and/or absorbed to the recording medium and another effect that the pH of the ink was modified on the recording medium by the hydrochloric acid that had been sprayed on the recording medium.

EXAMPLE 5

The procedure of the experiment of Example 3 was followed except that the ink of this example was prepared by mixing a dispersing agent of 2 parts by weight of styrene acrylic acid ethylacrylate (acid value: 350, average molecular weight: 3,000, solid content density: 20 wt % aqueous solution, neutralizing agent: KOH) and 7 parts by weight of the polyvinylether block polymer prepared as above with 5 parts by weight of MOGUL L (tradename, available from Cabot), 60 parts by weight of water and 10 parts by weight of ethylene glycol and that no aqueous solution of hydrochloric acid was sprayed and the ink layer was held to 55° C. As a result, it was found that the ink was fixed well as in Example 3 and the image recording performance of this example was comparable to that of Example 3. It may be assumed that the temperature of the aqueous dispersion ink of this example that was of low viscosity at a high temperature of 55° C. became more viscous when transferred onto the recording medium for image formation and cooled down.

EXAMPLE 6

The procedure of the experiment of Example 1 was followed except that the ink of this example was prepared in a manner as described below to achieve a similar fixation effect.

A 20 wt % aqueous solution of ethylenediamine was used as a first ink. An ink prepared by mixing 20 parts by weight of MOGUL L (tradename, available from Cabot) with 50 parts by weight of an epoxy modified silicon oil KF105 (tradename, available from Shinetsu Silicone), 3 parts by weight of a nonionic surfactant and 3 parts by weight of water was used as a second ink.

EXAMPLE 7

The procedure of the experiment of Example 3 was followed except that the two types of inks of Example 6 were used for indirect recording to achieve a fixation effect similar to that of Example 6.

EXAMPLE 8

The procedure of the experiment of Example 1 was followed except that the ink of this example was prepared in a manner as described below to achieve a similar fixation effect.

A 20 wt % hydrochloric acid/ethanol aqueous solution of tetraethoxysilane was used as a first ink. An ink prepared by mixing 30 parts by weight of dispersant, which was styrene acrylic acid ethylacrylate (acid value: 350, average molecular weight: 3,000, solid content density: 20 wt % aqueous solution, neutralizing agent: KOH), with 20 parts by weight of MOGUL L (tradename, available from Cabot) and 50 parts by weight of water was used as a second ink□D.

The procedure of the experiment of Example 3 was followed except that the two types of inks of Example 6 were used for indirect recording to achieve a fixation effect similar to that of Example 6.

COMPARATIVE EXAMPLE 1

The procedure of the experiment of Example 1 was followed except that no first ink was used. Immediately after the recording operation, another blank sheet of plain paper was pressed against the recorded side of the recording medium by applying a load of $2.5\times10^4$N/$m^2$ and the blank plain paper was visually checked for transfer of ink, thereby finding that black ink had been transferred thereto.

COMPARATIVE EXAMPLE 2

The procedure of the experiment of Example 1 was followed except that a different frequency was used for the piezoelectric ultrasonic mist generating device to produce an equivalent circle diameter of liquid droplets of 80 μm. Immediately after the recording operation, another blank sheet of plain paper was pressed against the recorded side of the recording medium by applying a load of 2.5 $10^4 N/m^2$ and the blank plain paper was visually checked for transfer of ink, thereby finding that black ink had been transferred thereto.

As proved by the above described examples, the present invention provides an image forming process, an image forming apparatus, an ink for liquid droplet recording and a liquid droplet ejection and projection method that provide an excellent ink fixation effect for high speed low energy consumption printing. Thus, an image forming process, an image forming apparatus, an ink for liquid droplet recording and a liquid droplet ejection and projection method are highly friendly to the environment.

What is claimed is:

1. An image forming process for forming an image on a recording medium with dots of ink, comprising the steps of:

generating the ink droplets such that each ink dot fixed on the recording medium has an average equivalent circle diameter of 10 μm or less; and fixing the ink to the recording medium by physical or chemical modification, wherein the ink droplets are formed from an ink containing block polymers having a polyvinyl ether structure, wherein the polyvinyl ether structure has a repeating unit structure expressed by the following general formula:

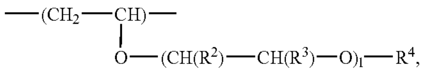

where 1 represents an integer of 1 to 18, each of $R^2$ and $R^3$ is independently either H or $CH_3$ and $R^4$ is selected from hydrogen, a straight chain, branched or cyclic alkyl group with 1 to 18 carbon atoms, and wherein at least one block of the block polymers has a stimuli responsive property and by the stimuli the ink is modified from a state of low viscosity to a state of high viscosity.

2. The image forming process according to claim 1, wherein multi-valued gradation expression of a picture element, which is a smallest unit for output, is performed by controlling the number of ink droplets impacting on the recording medium to form each dot.

3. The image forming process according to claim 1, wherein ink droplets of two or more different types are used and subjected to the physical or chemical modification when the ink droplets of different types are brought into contact with each other.

4. The image forming process according to claim 1, wherein the ink shows thermal sol-gel transition.

5. The image forming process according to claim 1, wherein the ink droplets are formed from an ink containing a silicon compound or a fluorine compound having a reactive group.

6. The image forming process according to claim 1, wherein the ink droplets are formed from an ink having a reactive property, and wherein a process of transition from sol containing a silicon oxide or a metal oxide to gel is performed.

7. The image forming process according to claim 1, wherein the ink droplets are formed from an aqueous dispersion ink having a stimuli responsive property and containing a polymer having a polyvinylether structure, water and a pigment or dye.

8. The image forming process according to claim 7, wherein the stimuli responsive property is a property of changing the state of the ink in response to a temperature change or an electromagnetic wave.

9. The image forming process according to claim 7, wherein the stimuli responsive property is a property of changing the state of the ink in response to a pH change or an ink density change.

10. The image forming process according to claim 1, wherein the ink further has a block polymer having a repeating unit structure expressed by the following general formula:

$$—(CH_2—CH\ (OR^1))—,$$

where $R^1$ is selected from a straight chain, branched or cyclic alkyl group with 1 to 18 carbon atoms, Ph, pyridyl (Pyr), Ph-Ph, Ph-Pyr, or $—(CH(R^2)—CH(R^3)—O)_l—R^4$ or $—(CH_2)_m—(O)_n—R^4$, the hydrogen in the aromatic ring can be substituted by a straight chain or branched alkyl group with 1 to 4 carbon atoms, while the carbon in the aromatic ring can be substituted by nitrogen, 1 represents an integer between 1 and 18 and m represents an integer between 1 and 36, while n represents 0 or 1, each of $R^2$ and $R^3$ is independently either H or $CH_3$ and $R^4$ is selected from hydrogen, a straight chain, branched or cyclic alkyl group with 1 to 18 carbon atoms, Ph, Pyr, Ph-Ph, Ph-Pyr, —CHO, $—CO—CH{=}CH_2$ and $—CO—C(CH_3){=}CH_2$, if the $R^4$ group is other than hydrogen, the hydrogen bonded to each carbon atom of $R^4$ can be substituted by a straight chain or branched alkyl group with 1 to 4 carbon atoms, F, Cl or Br and the carbon in the aromatic ring can be substituted by nitrogen.

11. The image forming process according to claim 1, wherein the image is formed by developing a latent image thereof by means of the ink droplets.

12. The image forming process according to claim 1, wherein the image is formed by transferring the ink droplets onto the recording medium by way of an intermediary transfer medium.

13. A process for ejecting ink droplets from an ejection head to a recording medium, comprising the steps of:

ejecting the ink droplets such that each ink dot fixed on the recording medium has an average equivalent circle diameter of 10 μm or less; and fixing the ink to the recording medium by physical or chemical modification, wherein the ink droplets are formed from an ink containing block polymers having a polyvinyl ether structure, wherein the polyvinyl ether structure has a repeating unit structure expressed by the following general formula:

$$-(CH_2-CH)- \quad \text{(CH bonded to)} \; O-(CH(R^2)-CH(R^3)-O)_l-R^4,$$

where 1 represents an integer of 1 to 18, each of $R^2$ and $R^3$ is independently either H or $CH_3$ and $R^4$ is selected from hydrogen, a straight chain, branched or cyclic alkyl group with 1 to 18 carbon atoms, and wherein at least one block of the block polymers has a stimuli responsive property and by the stimuli the ink is modified from a state of low viscosity to a state of high viscosity.

14. The process according to claim 13, wherein multi-valued gradation expression of a smallest unit for information output or input is realized by controlling the number of ink droplets impacting on the recording medium for each of the dots.

15. An image forming apparatus comprising ink ejection means for ejecting ink droplets such that each ink dot fixed on a recording medium has an equivalent circle diameter of 10 μm or less, and recording medium conveying means, the ink being fixed to the recording medium by physical modification or chemical modification, wherein the ink droplets are formed from an ink containing block polymers having a polyvinyl ether structure, wherein the polyvinyl ether structure has a repeating unit structure expressed by the following general formula:

$$-(CH_2-CH)- \quad \text{(CH bonded to)} \; O-(CH(R^2)-CH(R^3)-O)_l-R^4,$$

where 1 represents an integer of 1 to 18, each of $R^2$ and $R^3$ is independently either H or $CH_3$ and $R^4$ is selected from hydrogen, a straight chain, branched or cyclic alkyl group with 1 to 18 carbon atoms, and wherein at least one block of the block polymers has a stimuli responsive property and by the stimuli the ink is modified from a state of low viscosity to a state of high viscosity.

16. The image forming apparatus according to claim 15, wherein ink droplets of two or more different types are used and subjected to the physical or chemical modification when the ink droplets of different types are brought into contact with each other.

* * * * *

UNITED STATES PATENT AND TRADEMARK OFFICE
CERTIFICATE OF CORRECTION

PATENT NO. : 7,044,592 B2
APPLICATION NO. : 10/105442
DATED : May 16, 2006
INVENTOR(S) : Sato et al.

It is certified that error appears in the above-identified patent and that said Letters Patent is hereby corrected as shown below:

COLUMN 1
Line 40, “fixing,” should read --fixing--.

COLUMN 3
Line 27, “input” should begin a new indented line.
Line 30, “image” should begin a new indented line.
Line 32, “image” should begin a new indented line.
Line 33, “display” should begin a new indented line.

COLUMN 7
Line 1, “blades” should read --blade--.
Line 22, “an” (first occurrence) should read --a--.

COLUMN 9
Line 9, “between 30C” should read --between 30°C--.
Line 54, “use ink” should read --use of ink--.

COLUMN 15
Line 55, “have” should read --has--.

COLUMN 18
Line 23, “formula, R5” should read --formula, $R^5$--.

COLUMN 24
Line 41, “synthetic” should read --Synthetic--, and “The” should read --the--.

COLUMN 26
Line 45, “ink□D.” should read --ink.--.

UNITED STATES PATENT AND TRADEMARK OFFICE

CERTIFICATE OF CORRECTION

PATENT NO. : 7,044,592 B2
APPLICATION NO. : 10/105442
DATED : May 16, 2006
INVENTOR(S) : Sato et al.

It is certified that error appears in the above-identified patent and that said Letters Patent is hereby corrected as shown below:

COLUMN 28
Line 2 claim 7, "the" should begin a new paragraph,
Line 30 claim 10, "$-(CH_2)_m-(O)_m-R^4$," should read -- $-(CH_2)_m-(O)_n-R^4$,--.

Signed and Sealed this

Third Day of June, 2008

JON W. DUDAS
*Director of the United States Patent and Trademark Office*